July 2, 1935.  L. L. RANSOM  2,006,512
SYSTEM AND METHOD OF HEAT EXCHANGE BETWEEN LIQUIDS
Filed May 14, 1931   2 Sheets-Sheet 1
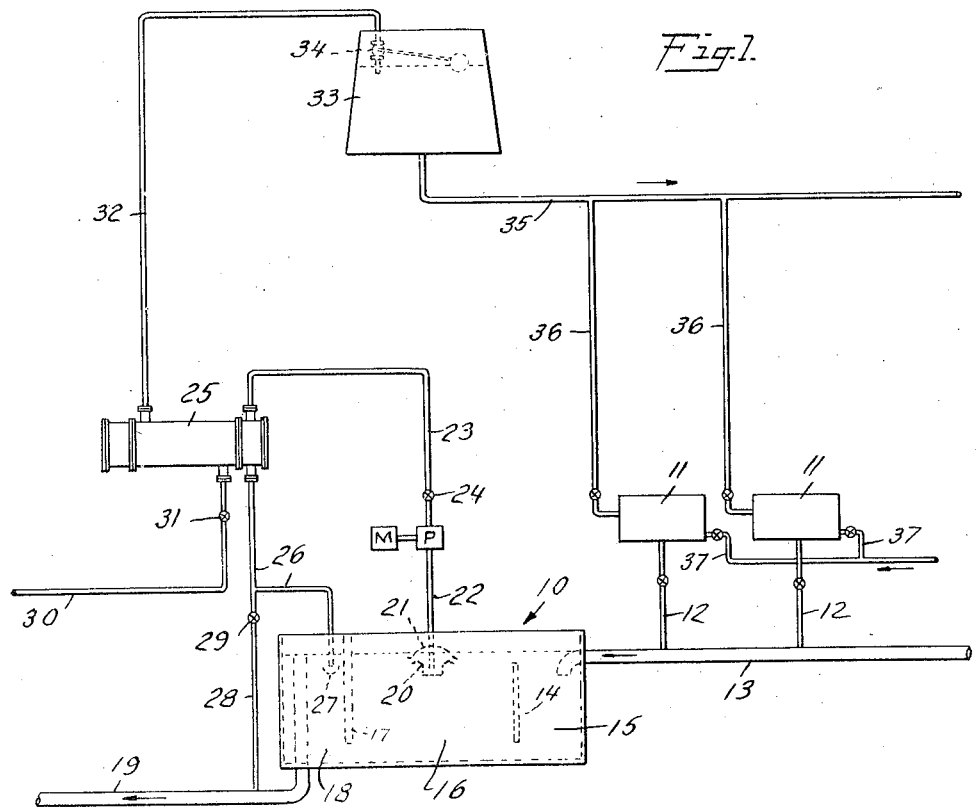
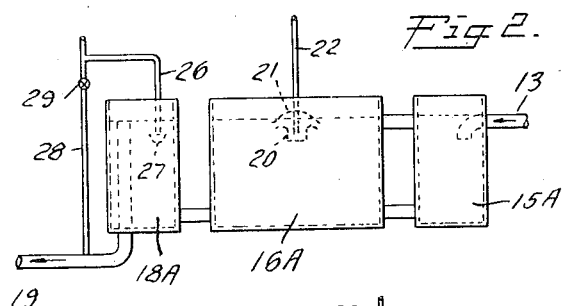
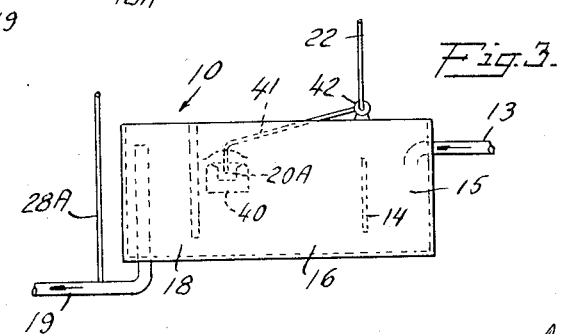
INVENTOR
Lewis L. Ransom
BY
Marshall & Hawley
ATTORNEYS July 2, 1935.  L. L. RANSOM  2,006,512
SYSTEM AND METHOD OF HEAT EXCHANGE BETWEEN LIQUIDS
Filed May 14, 1931  2 Sheets-Sheet 2
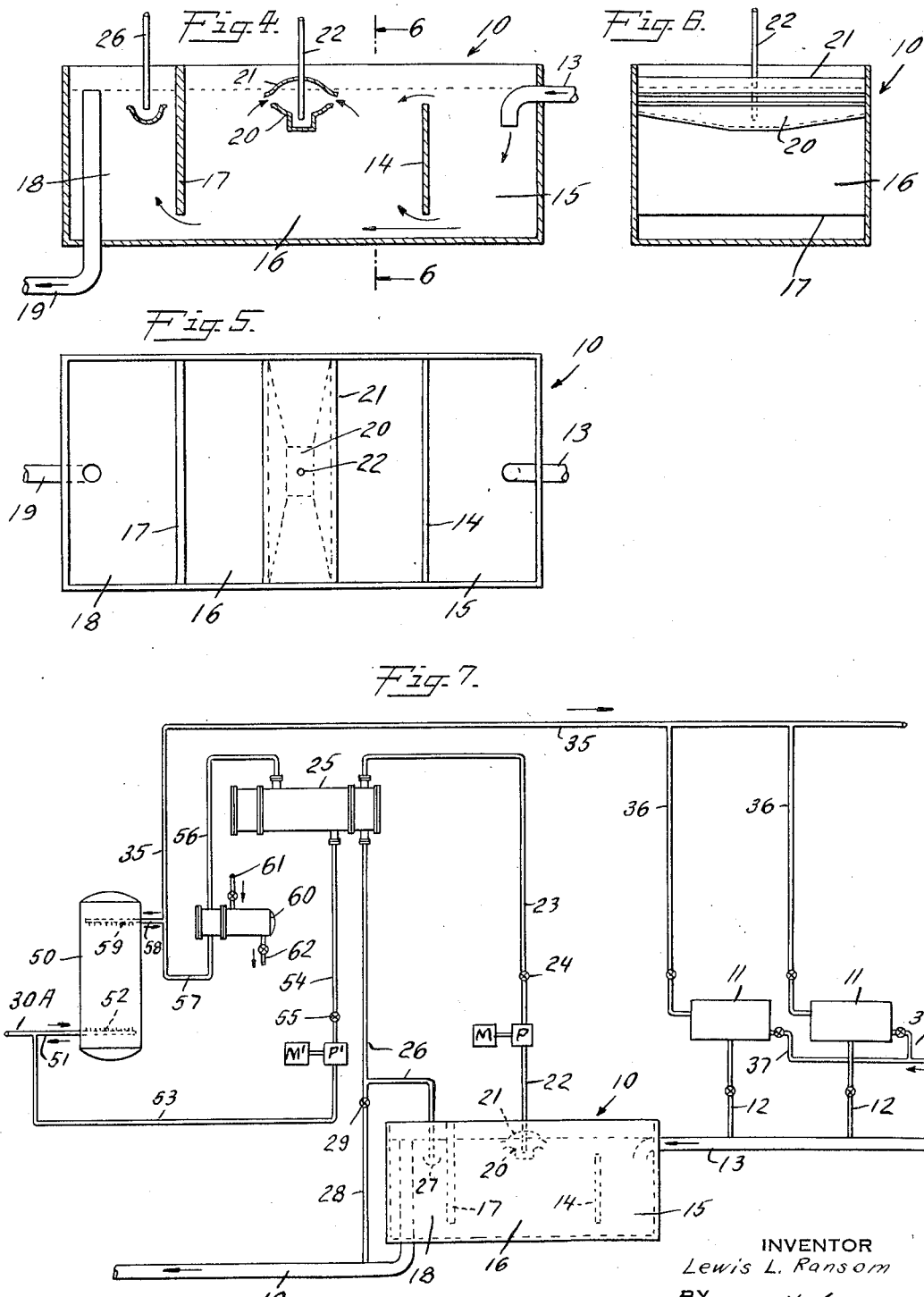
INVENTOR
Lewis L. Ransom
BY
Marshall Hawley
ATTORNEYS Patented July 2, 1935

2,006,512

UNITED STATES PATENT OFFICE 2,006,512

SYSTEM AND METHOD OF HEAT EXCHANGE BETWEEN LIQUIDS

Lewis L. Ransom, Jersey City, N. J.

Application May 14, 1931, Serial No. 537,470

16 Claims. (Cl. 257—242)

This invention relates to a system and method of heat exchange between liquids.

Its object is to provide a simple, efficient and economical system and method embodying therein the principles and the advantages of the invention described and claimed in United States Patent No. 1,698,561, issued to me January 8, 1929. A system and method of heating water or other liquids to an inherently controlled predeterminable temperature at a controlled predeterminable constant rate is described in said patent, and a method of accumulating the heated water in such a way as to meet and supply greatly varying demands without causing appreciable variation in either the desired liquid temperature, in the rate of heating or in the rate at which energy is supplied to do such heating. In the patent, a specific embodiment of the invention is shown and described, in which steam is used as the heating agency, the transfer of heat being made between steam, a gas, and a liquid. This uses the inherent characteristics of steam as a controlling agency, the latent heat of steam insuring an absorption of heat by the liquid to be heated, which is proportional to the rate of flow and the initial temperature of any given liquid, so that by controlling the rate of flow of a given liquid, its initial temperature and/or pressure of the steam maintained in contact with the surface surrounding such liquid, the amount of heat absorbed by the liquid and given up by the steam will be directly proportional to the steam condensing ability of the flow of liquid.

This present invention relates to the transfer of heat from a liquid to a liquid, utilizing the same general principles disclosed in my former patent and definitely applying these principles to both the liquid doing the heating and the liquid to be heated, using the method and system claimed in my former patent to control the liquid being heated and applying these principles in reverse procedure to control the liquid doing the heating.

In industrial plants using considerable quantities of heated water or other liquids, the heated liquids after serving their purpose or purposes are discharged to waste, and in dye houses, textile mills, laundries, etc., this discharged waste liquid contains a considerable amount of the original heat imparted to it, which can be recovered by methods of heat exchange, and by such methods the recovered heat can be utilized to a greater or lesser degree to preheat additional liquid to be heated.

With prevailing methods it is impossible to secure a uniform maximum exchange or recovery of heat, nor is it practically possible to predetermine or determine what exchange or recovery will be or is being obtained. Furthermore, the existing methods involve the use of greater heating transfer surface in the heat exchangers increasing their size and cost. This invention has for its salient object to provide a heat exchange system and method so designed, constructed and controlled that the maximum heat exchange between liquids will be obtained at minimum cost.

Another object of this invention is to provide a system so controlled that a minimum of variation in the desired rate of heat exchange takes place.

Another object of this invention is to provide a method and system that will operate continuously with a minimum of attention, and without intricate parts and arrangements.

Further objects of the invention will appear from the following specification.

Fig. 1 is a diagrammatic representation of a heating system which embodies the invention;

Fig. 2 is a similar view of a modified arrangement of that part of Fig. 1 which represents the waste liquid reservoir;

Fig. 3 illustrates a modification of the reservoir;

Fig. 4 is a sectional elevation of a preferred form of reservoir;

Fig. 5 is a plan view of the reservoir;

Fig. 6 is a sectional end elevation of the same, the section being taken on the line 6—6 of Fig. 4; and Fig. 7 is a representation of a modified system which also embodies this invention.

10 designates a reservoir or tank adapted to receive a supply of water or other liquid which has been initially heated, used for its purpose and either discharged to waste or stored for future cooling or re-heating. The liquid is led from devices 11, 11 through valve controlled pipes 12, 12 and a conduit 13 into one end of the reservoir 10 at a point near the normal liquid level therein. A baffle plate 14 is placed transversely across the reservoir with its upper edge below the liquid level and its lower edge above the bottom of the reservoir forming an intake compartment 15. This baffle plate 14 breaks up the flow of the incoming fluid and causes the hotter part of the liquid to flow over the baffle plate 14 and the colder part to flow under it. This insures a more complete separation of the hotter and colder parts of the liquid in the central part 16 of the reservoir from which it is led to the heat exchanger, as will be pointed out. The waste liquid enters the reservoir at varying rates and at varying temperatures. 17 is another transverse baffle plate extending above the liquid level line but not to the bottom of the reservoir and forming a discharge compartment 18 from which any excess of the liquid runs off through discharge pipe 19. The baffle plate 17 may have considerable thickness or be made of heat insulating material, because the temperature of the liquid on opposite sides of it is considerably different. The location of the upper end of this discharge pipe establishes a definite liquid level in the reservoir.

20 is a trough extending across the compartment 16, slightly below the liquid level line with its deepest part near the center. 21 is a shield over the trough with its edges slightly above and outside of the edges of the trough. 22 is a suction pipe with its end in the lower part of the trough leading to the intake of a pump P driven by a motor M. A pipe 23 in which is a valve 24 leads from the discharge end of the pump to a heat exchanger 25. 26 is a pipe from the heat exchanger to the reservoir 10 into the compartment 18 of which the liquid is discharged through a diffuser 27. 28 is a branch pipe controlled by a valve 29 connecting the pipe 26 directly with the outlet 19.

30 is a pipe from a substantially constant pressure which leads through a valve 31 to the heat exchanger 25. 32 is a pipe from the heat exchanger to a storage tank 33 into which the fluid is discharged through a float controlled valve 34. By means of the valve 31 the flow of fluid through the heat exchanger into tank 33 is adjusted to equal approximately the average rate of withdrawal from the tank through its discharge pipe 35 and the branch pipes 36, 36 to the utilities 11, 11, as it is required.

37, 37 designate steam pipes by means of which the preheated liquid is raised to the desired temperature in the utilities 11, 11 from which it is discharged, after use through the pipes 12, 12 and conduit 13 to the reservoir 10.

I will now describe the operation of the system which is illustrated in Fig. 1. It will be noted that the lower strata of the colder liquid in the reservoir is in communication throughout the entire area of the reservoir. It will also be noted that due to the baffle construction, only the coldest liquid in the lower part, or the liquid which has been circulated through the heat exchanger where a large amount of its heat content has been removed, can enter the compartment 18, from which it is discharged. Only the hottest liquid in the reservoir is removed by the pump P and that is propelled through a constant head, because the liquid level in the tank is established and maintained. The rate of flow of the waste liquid may be regulated or set to desired requirements by means of the valve 24, or if the pump is one of positive displacement, by varying the speed of the motor M. Therefore, with this arrangement it is possible to get a controllable constant uniform flow of liquid through that part of the heat exchanger 25 with which the pipes 23 and 26 are in communication. It has been shown that the liquid in that part of the heat exchanger with which the pipes 30 and 32 communicate is also under a controllable constant uniform flow. This arrangement then provides for changing the heat content of either or both of the liquids uniformly and at any desired rate. It may be utilized either for increasing the heat content of the liquid from pipe 30 or for decreasing the heat content of the liquid in the reservoir 10.

Because of the constant liquid level it is possible to use a submerged type pump in the trough, if desired. It is not necessary that the reservoir be a unitary structure. It may be made in several sections; for example, three, as shown in Fig. 2 at 15A, 16A and 18A, interconnected by pipes.

When the influx of waste liquid through the conduit 13 equals or exceeds the withdrawal through pipe 22, the valve 29 may be opened and the waste liquid from the heat exchanger discharged directly into the waste pipe 19 through the pipe 28.

In installations where the influx of waste liquid through the conduit 13 approximates the withdrawal through the pipe 22, it is not necessary to maintain an exact liquid level. In such cases the arrangement shown in Fig. 3 may be used. The pipe 28A runs directly from the heat exchanger to the waste pipe 19. A trough 20A is on a float 40 on the end of a movable pipe 41, connected with the pipe 22 by a swivel connection 42. In this case the liquid drawn from the reservoir is, as with the other constructions, taken from the upper level of the liquid in the central compartment, where it is hottest.

Referring now to Fig. 7, the parts which circulate the waste liquid are the same as those previously described, but the fresh liquid from a supply pipe 30A is heated by the method disclosed in my Patent No. 1,698,561. 50 is a storage tank. A pipe 51 connects the supply pipe with the lower part of this storage tank. 52 is a diffuser within this tank. The supply pipe is connected by a pipe 53 with the intake of a pump P', driven by a motor M'. The pump discharge is connected with the heat exchanger 25 by a pipe 54 in which is a valve 55. 56 is a pipe which leads the liquid from the heat exchanger to a heater 60 when it is subjected to the action of steam introduced through a pipe 61. The condensate runs off through a pipe 62. The heated liquid is connected by a pipe 57 with the pipe 35 which is also connected with the upper part of the storage tank 50 by a pipe 58 through a diffuser 59 within the tank.

By this arrangement the incoming liquid is preheated in the heat exchanger 25, thus utilizing the heat of the waste liquid and is then raised to the desired temperature by the efficient method disclosed in my former patent.

The invention herein is capable of many uses wherever a change of the heat content of a liquid is desired, for either heating or cooling it, and many modifications may be made without departing from its spirit and scope and I intend no limitations other than those imposed by the appended claims.

What I claim is:

1. A heat exchange system comprising a reservoir comprising a receiving compartment, a discharge compartment and an intermediate compartment having means for withdrawing liquid from a desired level of the liquid therein, communicating means between the lower parts of the three compartments and other communicating means between the receiving compartment and the intermediate compartment near the upper level of the liquid therein.

2. A reservoir having a receiving compartment, means for introducing a liquid therein, a discharge compartment, a waste pipe therein, the upper end of which is arranged to limit the upper liquid level in the compartments, and an intermediate compartment having means for withdrawing liquid from a desired level of the liquid therein, communicating means between the lower parts of the three compartments and other communicating means between the receiving compartment and the intermediate compartment near the upper level of the liquid therein.

3. A reservoir having a receiving compartment, means for introducing a liquid into the upper part thereof, a discharge compartment, a waste pipe therein, the upper end of which is arranged to maintain a constant liquid level in the compartments, and an intermediate compartment having means for withdrawing liquid from a desired level of the liquid therein, communicating means between the lower parts of the three compartments and other communicating means between the receiving compartment and the intermediate compartment near the upper level of the liquid therein.

4. A reservoir having a receiving compartment, a discharge compartment and an intermediate compartment, a suction pipe arranged to withdraw liquid from a desired level of the liquid in said intermediate compartment, communicating means between the lower parts of the three compartments and other communicating means between the receiving compartment and the intermediate compartment near the upper level of the liquid therein, combined with a heat exchanger, and means for propelling liquid from said suction pipe through the heat exchanger.

5. A reservoir having a receiving compartment, means for introducing a liquid therein, a discharge compartment, a waste pipe therein, the upper end of which is arranged to limit the upper liquid level in the compartments, an intermediate compartment, a suction pipe arranged to withdraw liquid from a desired level of the liquid in said intermediate compartment, communicating means between the lower parts of the three compartments and other communicating means between the receiving compartment and the intermediate compartment near the upper level of the liquid therein, combined with a heat exchanger, and means for propelling liquid from said suction pipe through the heat exchanger to the waste pipe.

6. A reservoir having a receiving compartment, means for introducing a liquid into the upper part thereof, a discharge compartment, a waste pipe therein, the upper end of which is arranged to maintain a constant liquid level in the three compartments, an intermediate compartment, a suction pipe arranged to withdraw liquid from a desired level of the liquid in said intermediate compartment, communicating means between the lower parts of the three compartments and other communicating means between the receiving compartment and the intermediate compartment near the upper level of the liquid therein, combined with a heat exchanger, and means for propelling liquid from said suction pipe through the heat exchanger to the discharge compartment.

7. A heat exchange system comprising a reservoir, a heat exchanger, means for propelling a liquid from a desired level of the liquid in the reservoir through said heat exchanger at an adjustable constant uniform rate, means for passing a liquid from another source through the heat exchanger, means for imparting further heat to said liquid from another source, a utility in which the liquid thus heated is used, and means for discharging said liquid into the reservoir.

8. A heat exchange system comprising a reservoir, a heat exchanger, means for propelling a liquid from a desired level of the liquid in the reservoir through said heat exchanger at an adjustable constant uniform rate, means for passing a liquid from another source through the heat exchanger at a constant uniform rate, means for imparting further heat to said liquid from another source, means for storing the liquid thus heated, a plurality of utilities into which the liquid may be passed from the storage means at irregular rates, and means for discharging said liquid into the reservoir.

9. A heat exchange system comprising a reservoir, a heat exchanger, means for propelling a liquid from a desired level of the liquid in the reservoir through said heat exchanger at an adjustable constant uniform rate, means for propelling a liquid from another source through the heat exchanger at a uniform rate equal to the average rate of withdrawal, means for imparting further heat to said liquid from another source at a definite adjustable rate of heat absorption, means for storing the liquid thus heated, a plurality of utilities into which the heated liquid may be passed, and means for discharging said liquid into the reservoir.

10. A heat exchange system comprising a reservoir, means therein for segregating a liquid according to its heat content, a heat exchanger, means for propelling a liquid from that part of the reservoir which contains the liquid of one extreme of temperature through said heat exchanger at an adjustable constant uniform rate and returning it to that part of the reservoir which contains the liquid of the opposite extreme of temperature, means for propelling a liquid from another source through the heat exchanger at an adjustable uniform rate equal to the average rate of withdrawal, means for further changing the heat content of said liquid from another source at a definite rate, means for storing the liquid thus treated, a plurality of utilities into which the treated liquid may be passed, and means for discharging said liquid into the reservoir.

11. A heat exchange system comprising a reservoir, a heat exchanger, means for propelling a liquid from a desired level of the liquid in the reservoir, through said heat exchanger at a constant uniform rate, means for passing a liquid from another source through the heat exchanger, means for imparting further heat to said liquid from another source, a utility in which the liquid thus heated is used and means for discharging said liquid into the reservoir.

12. A heat exchange system comprising a reservoir, a heat exchanger, means for propelling a liquid from a desired level of the liquid in the reservoir, through said heat exchanger at a constant uniform rate, means for passing a liquid from another source through the heat exchanger at a constant uniform rate, means for imparting further heat to said liquid from another source, a utility in which the liquid thus heated is used and means for discharging said liquid into the reservoir.

13. A heat exchange system comprising a reservoir, a heat exchanger, means for propelling a liquid from a desired level of the liquid in the reservoir, through said heat exchanger at a constant uniform rate, means for passing a liquid from another source through the heat exchanger at a constant uniform rate, means for imparting further heat to said liquid from another source, means for storing the liquid thus heated, a plurality of utilities into which the liquid may be passed from the storage means at irregular rates and means for discharging said liquid into the reservoir.

14. A heat exchange system comprising a reservoir, a heat exchanger, means for propelling a liquid from a desired level of the liquid in the reservoir through said heat exchanger at an adjustable constant uniform rate substantially equal to the rate of influx of said liquid into said reservoir, means for passing a liquid from another source through the heat exchanger at an adjustable constant uniform rate equal to the average rate of demand for said liquid, means for imparting further heat to said liquid from another source, means for storing the liquid thus heated, a plurality of utilities into which the liquid may be passed from the storage means at irregular rates and means for discharging said liquid into the reservoir.

15. A heat exchange system comprising a reservoir, a heat exchanger, means for propelling a liquid from the desired level of the liquid in the reservoir through said heat exchanger at a constant uniform rate, means for propelling a liquid from another source through the heat exchanger at a uniform rate equal to the average rate of withdrawal from the storage means, means for imparting further heat to said liquid from another source at an adjustable constant uniform rate, means for storing the liquid thus heated, a plurality of utilities into which the heated liquid may be passed and means for discharging said liquid into the reservoir.

16. A heat exchange system comprising a reservoir, means therein for segregating a liquid according to its heat content, a heat exchanger, means for propelling a liquid from that part of the reservoir which contains the liquid of one extreme of temperature through said heat exchanger at an adjustable constant uniform rate and returning it to that part of the reservoir which contains the liquid of the opposite extreme of temperature, means for propelling a liquid from another source through the heat exchanger at an adjustable constant uniform rate equal to the average rate of withdrawal from the storage means, means for further changing the heat content of said liquid from another source, means for storing the liquid thus treated, a plurality of utilities into which the heated liquid may be passed, and means for discharging said liquid into the reservoir.

LEWIS L. RANSOM.